July 25, 1950 A. MANHARTSBERGER 2,516,131
VALVE OPERATING MEANS
Filed Dec. 30, 1944
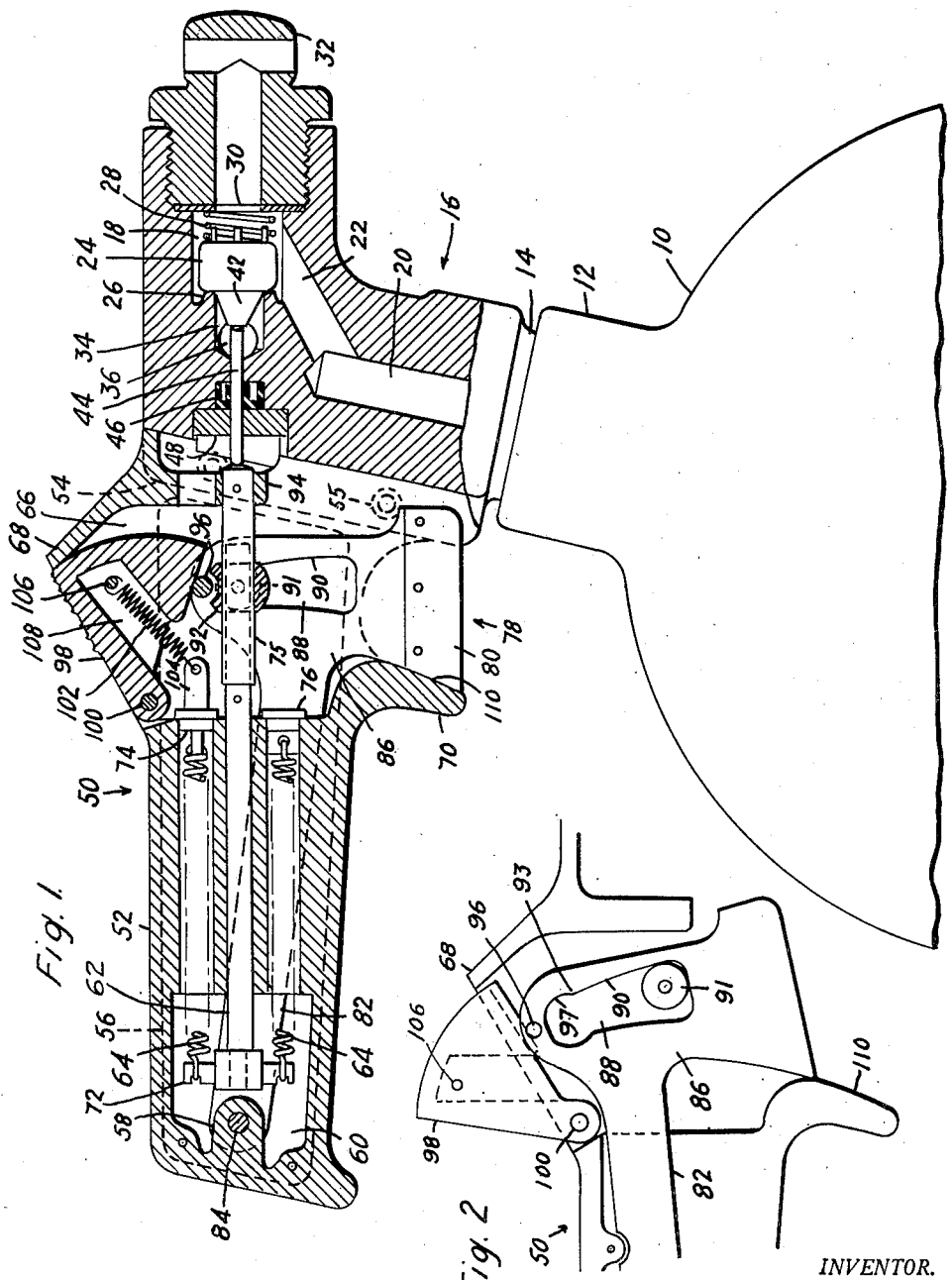
INVENTOR.
Albert Manhartsberger
BY
Ernest A. Joenen
Attorney Patented July 25, 1950

2,516,131

UNITED STATES PATENT OFFICE 2,516,131

VALVE OPERATING MEANS

Albert Manhartsberger, Bloomfield, N. J., assignor to Specialties Development Corporation, Bloomfield, N. J., a corporation of New Jersey Application December 30, 1944, Serial No. 570,607

6 Claims. (Cl. 251—26)

1

This invention relates to valve operating means and particularly to valve means for controlling the flow of fluid medium under pressure from a container associated with a handle for carrying the container.

Among the objects of the invention is to provide such handle in the form of a housing containing a valve operating member and means including a manually operable element or trigger for controlling the operation of the valve operating member by force other than, or separate from, the manual force required to actuate the trigger.

Another object is to put to new use a handle of the above indicated character which has heretofore only been provided with trigger means for transmitting manually applied force for operating a valve member either directly or through amplifying means.

Another object of the invention is to provide a valve operating device that is simple and durable in construction, economical to manufacture, and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a side view, partially in section and partially in elevation, of a valve control means constructed in accordance with the invention, together with a portion of a container associated therewith.

Figure 2 is a diagrammatic side view of a portion of the device somewhat as seen in Figure 1, showing central parts in different positions.

Referring to Figure 1, the device therein shown comprises a container 10, for a fluid medium under pressure such as carbon dioxide, having an outlet neck 12 in which is secured a tapered thread portion 14 of a head 16.

The head 16 forms a valve chamber 18 to which fluid passes from the container 10 through conduits 20 and 22 to normally hold in place a valve member 24 against a seat 26. The valve member 24 is also normally held seated by a spring 28 extending therefrom to a safety discharge disc 30 held in place by an anti-recoil plug 32. The fluid

2 exits from the chamber through a conduit 34 and a conduit 36 to a nipple (not shown) adapted to receive a conduit or hose for conducting the fluid to a point of discharge.

The valve member 24 has a protrusion 42 closely fitting the conduit 34 for centering the member on its seat, and adapted for cooperation with a short stem 44 extending through a packing gland 46 and a gland retainer member 48 into the inner space of a hollow handle 50.

The handle 50 comprises a central or base superstructure 52 secured to the head 16 as by a dovetail joint 54 and screws 55, and flanked by side closure members or plates 56 detachably secured thereto. The central structure 52 is provided with a pivot support 58 near its left hand or outer end as shown, a chamber 60 in which the support 58 is disposed, a central bearing bore for a valve operating member or rod 62 in line with the stem 44, bores above and below the rod 62 for springs 64, and a forward chamber 66 having an upper forward protrusion 68 and a lower rear protrusion 70. The rod 62 carries a rear end cross piece 72 connected to one end of each of the springs 64 which are held at the forward ends in the chamber 66 by plugs 74 and 76. A length 75 of the rod 62 is screw threaded thereto for adjustment relative to the stem 44.

A trigger 78 is made up of a central finger piece 80 and a pair of elongated flat plate like lever arms 82 flanking the finger piece 80, the rod 62 and the springs 64 and pivoted at their left or rear end to the pivot support 58, as by a pin 84.

At the forward end, enlarged depending portions 86 of the lever arms 82 flanking the finger piece 80 are each provided with an aperture 88 in lateral register with the corresponding aperture of the other, which apertures form a cam or stop surface 90 for rollers 91 disposed in the apertures 88 and journaled on a bearing member or sleeve 92 fixed to the rod 62. The latter, in addition to its support at the rear of the sleeve 92 is supported forwardly thereof by an extension 94 of the central superstructure 52.

As better seen in Figure 2, the surfaces 90 of the lever arms 82 extend upwardly over humps 93 into pocket surfaces 97 the latter of which, when the trigger is in its lower position lock the rollers 91 and the rod 62 against the action of the springs 64.

When the trigger is raised, the only manual force necessary to operate the same is that force, at substantially right angles to the force of the springs, required to force the rollers 91 out of the pockets 97 over the humps 93, whereupon the force of the springs acting through the rollers against the surfaces 90 completes the upward movement of the trigger and advances the rod 62 to operate the stem 44.

A pin 96 forms a brace between the trigger lever arms 82 above the sleeve 92 and is adapted to be engaged by a reset trigger or thumb piece 98 pivoted to the central structure 52 as by a pin 100 and held against the pin 96 by a spring 102 connected between an extension 104 on the plug 74 and a pin 106 in a hollow 108 on the trigger 98. The latter is shielded by the protrusion 68. The lower protrusion 70 shields the trigger 78 and is curved along an arc 110 about the axis of the pivot pin 84 to closely slidably fit a correspondingly curved rear surface of the portions 86.

In operation, when the trigger 78 is moved from the position of Figure 1 to the position of Figure 2, the rod 62 is released for movement by the springs 64 to move the stem 44 for unseating the valve member 24, whereupon the fluid is released from the container 10 to flow through the conduits 20 and 22, the chamber 18 and the conduits 34 and 36 to the point of discharge.

In resetting the trigger 78 to stop the flow, or upon refilling the container, the upper trigger or thumb piece 98 is pushed downwardly against the pin 96, which action moves the lower trigger 78 downwardly about its pivot pin 84, and the cam surface 90 retracts the rod 62 against the force of the springs 64 and reduces the manual force necessary to operate the thumb piece.

From the foregoing description, it is apparent that a valve operating means has been provided which reduces the manual effort required in releasing powerful forces quickly, and increases the range of pressures adapted for quick manual release. The invention provides for effecting initial opening of the valve in a facile manner, whereafter full opening of the valve is readily effected with a minimum of effort. The device of the invention is simple, rugged, and durable, and is an improvement generally in its field of service.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A discharge head comprising a housing including a valve chamber having an outlet, a hollow member connected to said head, a valve mem- in said chamber normally seated to close said chamber outlet, a stem extending between said chamber and the interior of said hollow member providing for unseating said valve member, a rod in said hollow member in line with said stem, spring means in said hollow member connected thereto and to said rod for moving the latter to actuate said stem to unseat said valve member, an elongated cam pivotally mounted in said hollow member near the outer end of the latter and extending along said rod and formed with a forward cam portion normally restraining said rod from operation by said spring means and movable transversely of the rod for releasing the same, and a second trigger pivoted to said hollow member and spring biased against said first trigger adjacent to said cam portion for moving said rod and said first trigger to normal position.

2. A discharge head comprising a housing including a valve chamber, having a valve seat, and a handle portion extending laterally from said housing; a valve member normally seated on said valve seat; a rod slidably mounted on said handle portion for effecting unseating of said valve member; a spring connected to said handle portion and said rod for moving said rod to effect unseating of said valve member; a trigger pivotally mounted on said handle portion for transverse movement with respect to said rod, said trigger having a cam portion constructed and arranged to normally restrain said rod from operation by said spring and, upon transverse movement of said trigger, to release said rod for operation by said spring to effect unseating of said valve member; a second trigger pivotally mounted on said handle portion for moving said first trigger to normal position and thereby move said rod in opposition to said spring out of valve unseating position; and a spring for urging said second trigger into engagement with said first trigger.

3. A discharge head comprising a housing including a valve chamber, having a valve seat, and a handle portion extending laterally from said housing; a valve member normally seated on said valve seat; a rod slidably mounted on said handle portion for effecting unseating of said valve member; a spring connected to said handle portion and said rod for moving said rod to effect unseating of said valve member; a trigger pivotally mounted on said handle portion for transverse movement with respect to said rod, said trigger having a cam portion constructed and arranged to normally restrain said rod from operation by said spring and, upon transverse movement of said trigger, to release said rod for operation by said spring to effect unseating of said valve member; and a second trigger pivotally mounted on said handle portion for moving said first trigger to normal position and thereby move said rod in opposition to said spring out of valve unseating position.

4. A discharge head comprising a housing including a valve chamber, having a valve seat, and a handle portion extending laterally from said housing; a valve member normally seated on said valve seat; a rod slidably mounted on said handle portion for effecting unseating of said valve member; a spring connected to said handle portion and said rod for moving said rod to effect unseating of said valve member; and a pair of opposed triggers pivotally mounted on said handle portion for transverse movement with respect to said rod, one of said triggers having a cam portion and constructed and arranged to normally restrain said rod from operation by said spring and, upon transverse movement of said trigger into operated position, to release said rod for operation by said spring to effect unseating of said valve member, and the other of said triggers being operable to move said aforementioned trigger from its operated position to its normal position.

5. A discharge head comprising a housing including a valve chamber, having a valve seat, and a handle portion extending laterally from said housing; a valve member normally seated on said valve seat; a rod slidably mounted on said handle portion for effecting unseating of said valve member; a cam follower on said rod; a spring connected to said handle portion and said rod for moving said rod to effect unseating of said valve member; and a trigger pivotally mounted on said handle portion for transverse movement with respect to said rod, said trigger having a cam slot for reception of said cam follower and constructed and arranged to normally restrain said rod from operation by said spring and, upon transverse movement of said trigger, to release said rod for operation by said spring to effect unseating of said valve member.

6. A discharge head comprising a housing including a valve chamber, having a valve seat, and a handle portion extending laterally from said housing; a valve member normally seated on said valve seat; a rod slidably mounted on said handle portion for effecting unseating of said valve member; a spring connected to said handle portion and said rod for moving said rod to effect unseating of said valve member; and a trigger pivotally mounted on said handle portion for transverse movement with respect to said rod, said trigger having a cam portion constructed and arranged to normally restrain said rod from operation by said spring and, upon transverse movement of said trigger, to release said rod for operation by said spring to effect unseating of said valve member.

ALBERT MANHARTSBERGER.

REFERENCES CITED

The following references are of record in the file of this patent:

UNITED STATES PATENTS

| Number | Name | Date |
| --- | --- | --- |
| 1,093,585 | Hoffman | Apr. 14, 1914 |
| 1,329,209 | Riccio | Jan. 27, 1920 |
| 1,764,991 | Siebs | June 17, 1930 |
| 1,877,197 | Price | Sept. 13, 1932 |
| 2,208,490 | Axtell | July 16, 1940 |
| 2,264,655 | Brackmann | Dec. 2, 1941 |
| 2,291,049 | Magnuson | July 28, 1942 |
| 2,308,944 | Turco | Jan. 19, 1943 |
| 2,310,552 | Schaaf | Feb. 9, 1943 |
| 2,362,784 | Ward | Nov. 14, 1944 |
| 2,369,357 | Kunz | Feb. 13, 1945 |
| 2,375,615 | Boal | May 8, 1945 |